US011251975B1

(12) United States Patent
Wahla et al.

(10) Patent No.: US 11,251,975 B1
(45) Date of Patent: Feb. 15, 2022

(54) BLOCK CHAIN BASED TRUSTED SECURITY INFRASTRUCTURE

(71) Applicant: Seagate Technology LLC, Cupertino, CA (US)

(72) Inventors: Muhammad Jawad Alam Wahla, Singapore (SG); Nino Wicaksono, Singapore (SG); Meherzad Firoze Aga, Longmont, CO (US); Monty Aaron Forehand, Loveland, CO (US)

(73) Assignee: Seagate Technology LLC

( * ) Notice: Subject to any disclaimer, the term of this patent is extended or adjusted under 35 U.S.C. 154(b) by 218 days.

(21) Appl. No.: 15/717,387

(22) Filed: Sep. 27, 2017

(51) Int. Cl.
*H04L 29/06* (2006.01)
*H04L 9/32* (2006.01)
*H04L 9/06* (2006.01)
*G06Q 20/38* (2012.01)

(52) U.S. Cl.
CPC .......... *H04L 9/3263* (2013.01); *H04L 9/0618* (2013.01); *H04L 9/3213* (2013.01); *H04L 9/3234* (2013.01); *H04L 9/3247* (2013.01); *H04L 63/0281* (2013.01); *G06Q 20/3829* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 6,732,278 B2 | 5/2004 | Baird, III et al. | |
| 6,754,845 B2 | 6/2004 | Kursawe et al. | |
| 8,925,059 B2 | 12/2014 | Mackler | |
| 9,474,586 B2 | 10/2016 | Vu et al. | |
| 9,652,604 B1 | 5/2017 | Johansson et al. | |
| 9,722,790 B2 | 8/2017 | Ebrahimi | |
| 2014/0006247 A1 | 1/2014 | Chai et al. | |
| 2014/0006274 A1 | 1/2014 | Grigg et al. | |
| 2016/0005032 A1 | 1/2016 | Yau et al. | |
| 2017/0005804 A1* | 1/2017 | Zinder | H04L 9/3247 |
| 2018/0078843 A1* | 3/2018 | Tran | G16H 40/63 |

(Continued)

OTHER PUBLICATIONS

Christian Cachin and Marko Vukolic, "Blockchain Consensus Protocols in the Wild," IBM Research, Jul. 2017, pp. 1-24, Zurich.

(Continued)

*Primary Examiner* — Jeffery L Williams
(74) *Attorney, Agent, or Firm* — Hall Estill Law Firm (57) ABSTRACT

Apparatus and method for distributed authentication in a data storage system using block chain technology. In some embodiments, a requested transaction is generated to perform a selected security operation upon a data processing device in a computer network. The requested transaction is validated and propagated to a plurality of nodes. The nodes use a consensus mechanism to quasi-randomly select a particular node to generate a new block listing the requested transaction. The new block is validated, propagated among the plurality of nodes, and added to a block chain data structure. A processing node processes the requested transaction from the block chain data structure to authorize the selected security operation. Credits may be debited and credited between requesting nodes and the processing node for each transaction. Different types of credits may be used for different types of security operations.

18 Claims, 8 Drawing Sheets

(56) References Cited

U.S. PATENT DOCUMENTS

| | | | | |
|---|---|---|---|---|
| 2018/0191502 A1* | 7/2018 | Karame | ............... | G06Q 20/065 |
| 2018/0260212 A1* | 9/2018 | Wisnovsky | ............... | G06F 8/71 |
| 2018/0287805 A1* | 10/2018 | Ramathal | ............. | H04L 9/3239 |
| 2018/0343175 A1* | 11/2018 | Bathen | ................ | H04Q 41/5019 |
| 2019/0139043 A1* | 5/2019 | Davis | ............... | G06Q 20/38215 |
| 2019/0146778 A1* | 5/2019 | Smith | ................... | H04L 9/3239 |
| | | | | 717/170 |
| 2019/0149336 A1* | 5/2019 | Lancashire | ............ | G06Q 20/06 |
| | | | | 713/176 |
| 2019/0236716 A1* | 8/2019 | Kasper | ................... | G06Q 40/12 |
| 2019/0253262 A1* | 8/2019 | Smith | ................... | H04L 9/0861 |
| 2019/0303603 A1* | 10/2019 | Courtney | ............ | G06F 12/1416 |

OTHER PUBLICATIONS

Miguel Castro and Barbara Liskov, "Practical Byzantine Fault Tolerance," Third Symposium on Operating Systems Design and Implementation, Feb. 1999, pp. 173-186, vol. 99, New Orleans.

Dr. Gideon Greenspan, "MutiChain Private Blockchain—White Paper," Coin sciences Ltd. White Paper, Jun. 2015, pp. 1-17.

Leslie Lamport, Robert Shostak and Marshall Pease, "The Byzantine Generals Problem," ACM Transactions on Programming Languages and Systems (TOPLAS), Jul. 1982, pp. 382-401, vol. 4, No. 3.

Satoshi Nakamoto, "Bitcoin: A Peer-toPeer Electronic Cash System," 2008, pp. 1-9.

Diego Ongaro and John Ousterhout, "In search of an Understandable Consensus Algorithm," 2014 USENIX Annual Technical Conference (USENIX ATC 14), 2014, pp. 305-319, Philadelphia PA.

* cited by examiner

ADMIN TABLE

← 138

| ASSET TYPE | OWNER | CREDIT BALANCE | VALIDITY |
|---|---|---|---|
| AUTHENTICATION | PUBLIC KEY (USER 1) | 10 | EXPIRES X1 |
| AUTHENTICATION | PUBLIC KEY (USER 2) | 10 | EXPIRES X2 |
| AUTHENTICATION | PUBLIC KEY (TSI) | 1000 | - |
| AUTHENTICATION | PUBLIC KEY (USER 3) | 10 | EXPIRES X3 |
| AUTHENTICATION | PUBLIC KEY (USER 4) | 10 | EXPIRES X4 |
| AUTHENTICATION | PUBLIC KEY (USER 5) | 10 | EXPIRES X5 |

FIG. 8

ADMIN TABLE

← 138

| OWNER | RED CREDITS (FW UPGRADE) | BLUE CREDITS (UNLOCK PORT) | GOLD CREDITS (ANY ACTION) |
|---|---|---|---|
| USER 1 | 6 | 10 | 10 |
| USER 2 | 8 | 10 | 10 |
| USER 3 | 0 | 5 | 0 |
| USER 4 | 10 | 0 | 10 |
| USER 5 | 4 | 7 | 8 |
| USER 6 | 0 | 0 | 0 |

FIG. 9

TRANSACTION FORMAT

⬩—180

| | 182 | 184 | 186 | 188 |
|---|---|---|---|---|
| | SERIAL NUMBER: AAA | CHALLENGE | USER 1: PUBLIC KEY | AUTHENTICATION COUNT - 10 |
| | USER 1: PUBLIC KEY | CHALLENGE | TSI: PUBLIC KEY | AUTHENTICATION COUNT - 1000 |

↓

| SERIAL NUMBER: AAA | CHALLENGE | USER 1: PUBLIC KEY | AUTHENTICATION COUNT - 9 |
|---|---|---|---|
| USER 1: PUBLIC KEY | CHALLENGE | TSI: PUBLIC KEY | AUTHENTICATION COUNT - 1001 |

FIG. 10

TRANSACTION FORMAT

⬩—180

| 186 | 190 | 192 | 194 |
|---|---|---|---|
| USER 1: PUBLIC KEY | FW REVISION NO. | FW IMAGE | CHALLENGE VALUE DATA |

FIG. 11

PROPAGATION

FIG. 12

MINING SCHEME

BLOCK CHAIN BASED TRUSTED SECURITY INFRASTRUCTURE

SUMMARY

Various embodiments of the present disclosure are generally directed to cryptographic processing systems, and more particularly to distributed security authentication in a data storage system using block chain technology.

In some embodiments, a requested transaction is generated to perform a selected security operation upon a data processing device in a computer network. The requested transaction is validated and propagated to a plurality of nodes. The nodes form a consensus to select a particular node to generate a new block listing the requested transaction. The new block is generated by the particular node, validated by other nodes, and added to a block chain data structure. A processing node processes the requested transaction from the block chain data structure to authorize the selected security operation.

These and other features which characterize various embodiments of the present disclosure can be understood in view of the following detailed discussion and the accompanying drawings.

DETAILED DESCRIPTION

Data security schemes are used to reduce or eliminate access to data by unauthorized users of digital data processing systems. Data security schemes can employ a variety of cryptographic security techniques to protect such systems from third party attacks.

Some systems use a centralized trust-based security protocol to allow a particular user to gain access to a storage device. This may involve various steps carried out to respectively authenticate the user of the storage device (e.g., verify the user as a "trusted" user), to authenticate the storage device to a remote centralized server, and to authenticate the server to the user and the storage device. Authentication can be carried out in a variety of ways such as through the use of challenge values, public and private encryption keys, hash values, digital signatures, etc. Once the various entities have been mutually verified, a security based operation can be carried out by the user with the storage device. Examples include firmware updates, access to secured data storage volumes, etc.

While operable, there are a number of limitations associated with this approach. Centralized trust-based security protocols can require significant system resources at both the local device level and the remote server level to track and authenticate the various entities and the requested transactions. Depending on the configuration of the security protocols, the system may be susceptible to spoofing attacks where an attacker attempts to impersonate an authorized user, and rollback attacks where an attacker attempts to install a previous version of firmware to take advantage of known security weaknesses in the previous version.

Traditional cryptosystems based on cryptographic calculations are generally susceptible to forced power attacks involving sufficient processing power to "break" the existing encryption system. No matter how complex a given cryptosystem algorithm may be, it is understood that, with the continued accelerating advancements in successive generations of processors, sooner or later a processing technology will likely be developed that is sufficiently powerful to "crack" the system in a reasonable amount of time.

A new encryption methodology referred to as block chain technology has become increasingly used in modern computer network systems. A well known use of block chain technology is with the digital currency "bitcoin," which is a peer-to-peer cryptocurrency that facilitates anonymous online financial transactions. Bitcoin technology maintains a block chain that provides a public ledger of various bitcoin transactions. Maintenance of the block chain is performed by a network of communicating nodes that run bitcoin application software. Mining operations are carried out to add new blocks of validated transactions to the block chain at a regular rate (e.g., every 10 minutes). The mining operations are performed by massive data centers located throughout the world that perform quintillions of calculations during each cycle to provide the proof-of-work to validate and add each new block to the chain.

Security of the bitcoin system is not directly based on the complexity of the encryption system; rather, the security of the system is based on the sheer processing power that would be required to alter a previously recorded transaction in the chain and recompute all subsequently generated blocks up to the present time. A successful modification of the existing block chain would require an attacker to have the equivalent of at least 51% of the total collective processing power currently utilized by the system.

Since it is presumed that the level of processing technology available to an attacker would progress more or less at the same rate as the combined processing technology used by the legitimate processing nodes of the system, the system is largely secure and unbreakable. Attacks involving the bitcoin system have thus largely been limited to the misappropriation of the private encryption keys of the various bitcoin owners, which is an attack point that conventional cryptographic systems are susceptible to as well.

Accordingly, various embodiments of the present disclosure are generally directed to an apparatus and method that employ block chain technology to provide a trusted security infrastructure for a data processing environment. As explained below, a population of data storage devices are arranged into a network. A block chain based authentication mechanism is used to enable the network to reach a consensus on the trust of a particular user. Once established, the trust is transferred to the associated storage device through a novel methodology.

The block chain based system as embodied herein is decentralized, anonymous, trustless and collectively reliable. Each user has a public/private pair of encryption keys to perform transactions which are added to a block chain. The block chain is a public ledger available to all nodes in the system. The transactions are carried out by users to perform security operations associated with the various storage devices. The users sign the transactions using the private keys, and each node verifies the transactions before relaying them to other nodes. Invalid transactions are discarded, and validated transactions propagate throughout the entire network.

Valid transactions are ordered and packaged into a candidate block on a regular basis. A consensus mechanism involving multiple neighboring nodes in the network is used to elect a node that will operate to create a certified or valid block involving the transactions from the candidate block. A lottery schema is used so that different nodes create the various blocks in a non-predictable manner. Each created block is propagated through the network and validated by other nodes, each of which digitally sign the block.

Once a threshold number of validations have occurred, the block is appended to the block chain and published to the entire network. Individual nodes check for the validated transactions that appear in each newly added block, ensure the block is properly signed by different nodes, and proceed to perform the authenticated transaction. To the extent that challenge values or other data are required to complete the authentication transaction, such data may be included in the newly added block.

A novel credit and debit system can be utilized as part of the block chain administrative management process. A trusted security infrastructure (TSI) authority manages the credit/debit accounting transfers, as well as performs normal challenge-response operations. The TSI authority is a logical entity and may or may not be realized in a separate server dedicated to this purpose. Administrative rights are granted to one or more administrator users to access and operate the TSI authority from substantially any node in the network.

Mining and verification of new blocks are carried out by a subset of the nodes authorized by the system. These nodes are referred to as whitelisted (WL) nodes and are identified by a whitelist that is published and maintained by the TSI authority. The WL nodes may operate as normal user nodes in the system as well.

New credits may be issued to the various nodes from time to time, such as when a new node is added to the system. The credits are transferred by the nodes to the TSI authority (e.g., "spent") during each transaction. Unlike the bitcoin system where new bitcoins are mined and introduced into the currency system at a regular rate, the credits may be generated (or deleted) as needed by the various administrators at appropriate times. Such adjustments in the numbers of credits in the system may be recorded as transactions in the block chain. A user can be locked out of the security aspects of the system by reducing the available balance of credits to zero (or by providing the user with a negative balance).

The credits can be organized in a variety of ways. In some embodiments, the cost of every transaction, regardless of type, can be set equal to one credit (or some number of credits). In other embodiments, different transactions can require different numbers of credits. In still other embodiments, different types of credits can be issued to different users to carry out different transactions. The credits are transferred to the TSI authority from the various nodes, and may be replenished from time to time as needed. In some cases, the credits may be transferred from one node to the next.

Because the entire transaction history is made available via the block chain, various forms of attacks such as spoofing and rollback attacks can be thwarted. For example, the firmware upgrade history for a given storage device can be reflected in the block chain, which can enable the device to prevent an unauthorized attempt to install a previous version of the firmware. To the extent that sensitive and/or confidential information is incorporated into the block chain, such can be protected via encryption or other cryptographic processing techniques. The block chain can be configured to incorporate any number of different types of required information, including entire firmware images, data sets, etc.

Figure 1:
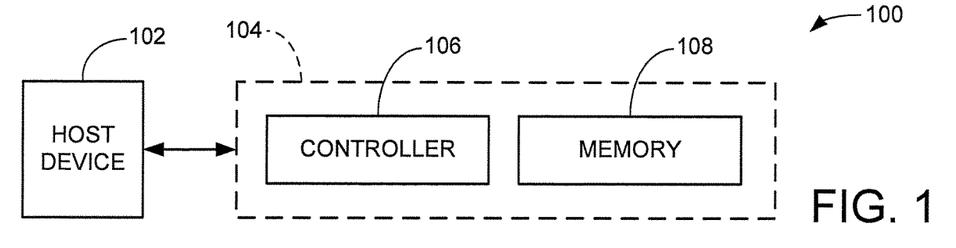
FIG. 1 is a functional block representation of a data processing system which operates in accordance with various embodiments of the present disclosure.

These and other features and advantages of various embodiments can be understood beginning with a review of FIG. 1 which shows a data processing system 100. The data processing system 100 includes a host device 102 operably coupled to a data storage device 104. This is merely exemplary as any number of different types of data processing environments can be used as desired, including environments that do not involve data storage systems.

The host device 102 and the data storage device 104 in FIG. 1 can each take a variety of forms. Without limitation, the host device 102 may take the form of a personal computer, workstation, server, laptop, portable handheld device, smart phone, tablet, gaming console, RAID controller, etc. The data storage device 104 may be a hard disc drive (HDD), solid-state drive (SSD), hybrid solid state drive (HSSD), thumb drive, optical drive, an integrated memory module, a multi-device storage enclosure, etc. The data storage device 104 may be incorporated into the host device as an internal component or may be an external component accessible via a communication pathway with the host device 102 including a cabling connection, a wireless connection, a network connection, etc.

For purposes of the present discussion, it will be contemplated that the host device 102 is a computer and the data storage device 104 provides a main memory store for user data generated by the host device, such as a solid state drive (SSD).

Figure 2:
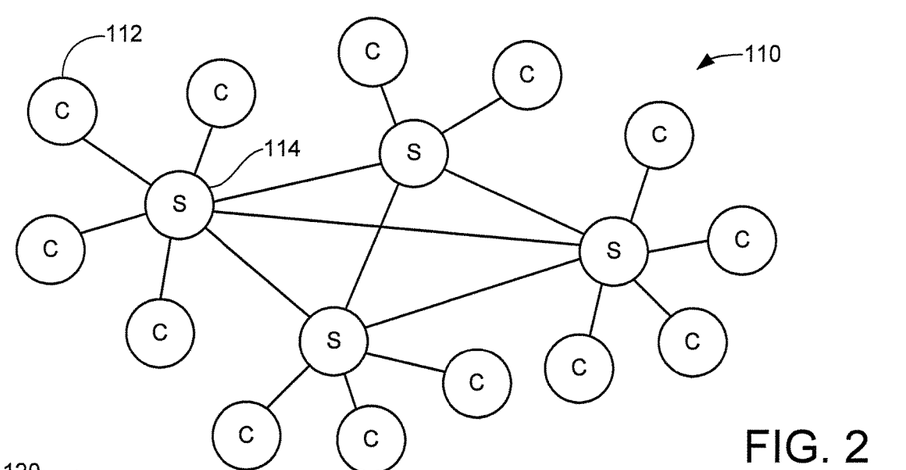
FIG. 2 shows a configuration of a computer network that may employ data processing elements of FIG. 1 in some embodiments.

FIG. 2 shows a distributed computer network 110. The network 110 has a number of interconnected processing nodes including client (C) nodes 112 and server (S) nodes 114. The client nodes may represent local user systems with host computers and one or more storage devices, as depicted in FIG. 1, and the server nodes may interconnect groups of remotely connected clients. Other arrangements can be used. The processing described herein can be carried out by both server and client nodes.

Generally, any node in the system can communicate directly or indirectly with any other node. The network 110 can be a private network, a public network, or a combination of both public and private networks. It is contemplated that the network 110 is a low trust environment potentially accessible to attacks by third parties. A block chain protection scheme is implemented to protect against such attacks, as will now be described.

Figure 3:
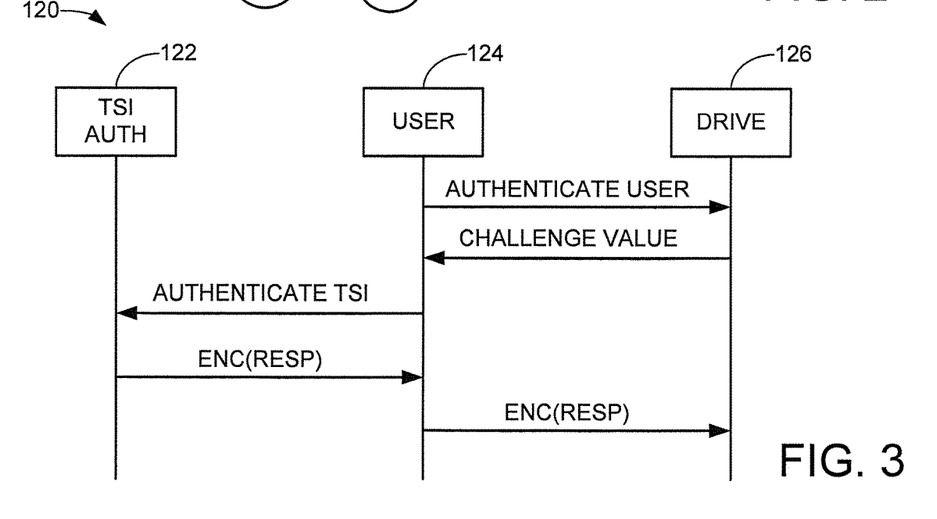
FIG. 3 is a sequence diagram illustrating an authentication transaction carried out in some embodiments.

FIG. 3 is a sequence diagram 120 illustrating a high level authentication sequence that may be carried out by aspects of the network 110 in accordance with various embodiments. A trusted security infrastructure (TSI) 122, also sometimes referred to as the TSI authority or the TSI authority circuit, is a logical entity comprised of hardware and/or software designated to handle certain functions within the protection scheme. In some cases the TSI authority 122 may be a separate server dedicated to this purpose, or may be managed and distributed as required among various nodes by authorized system administrators (administrative users).

The diagram in FIG. 3 further includes a user 124 and a drive 126 (e.g., SSD). Generally, the user 124 has enacted a sequence to gain authorized access a protected security aspect of the drive 124. In order to do so, sufficient trust must be established between the TSI authority 122, the user 124 and the drive 126. It will be understood that the "user" may be a human who communicates with the system via a user device (e.g., host computer, etc.). The user may thus initiate certain actions via a user interface of such device, but computational processing is carried out at the machine level. For simplicity, subsequent references to a "user" will be understood based on context as describing the associated user device.

To authenticate each of these entities to the others, the user 124 initiates the process such as by requesting an encrypted challenge string from the drive 126. The user may supply an initial value which is then encrypted by the drive, or some other sequence may be employed. The challenge value may be forwarded to the TSI 122, which processes the challenge value in some way to provide an encrypted response, which may be processed by the user and the drive. Once all entities are satisfied, the user proceeds with the requested transaction. Examples that may involve requested transactions may include opening diagnostic ports of the storage device; installing new firmware; performing specific security actions such as secure erasure, drive unlock, enablement of serial ports, accessing secured volumes, etc. Many such inter-entity sequences are known in the art, and substantially any suitable sequence can be used as desired. Regardless of form, however, the various authentication steps out are carried out in a decentralized manner using block chain techniques described below.

Figure 4:
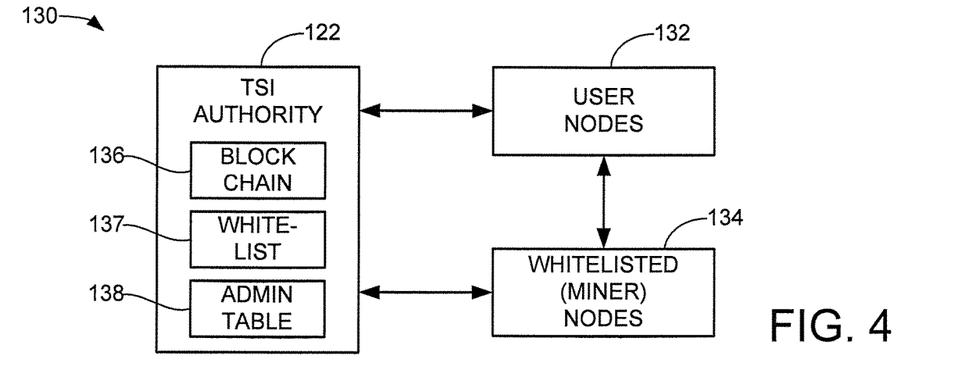
FIG. 4 is a functional block diagram illustrating aspects of an authentication transaction processing system in some embodiments.

FIG. 4 is a functional block representation of aspects of the block chain security infrastructure, numerically denoted at 130. The TSI authority block 122 from FIG. 3 is shown in conjunction with a plurality of user nodes 132 and whitelisted (miner) nodes 134. The nodes 132, 134 can correspond to the various nodes 112 and 114 in FIG. 2.

The TSI authority 122 maintains and publishes a number of data structures including a block chain (public ledger) 136, a whitelist 137 of the verified WL nodes 134, and an administrative table 138. The WL nodes 134 may be selected based on physical aspects, such as nodes within a secure environment (e.g., private nodes within a network that communicate with public nodes outside that network, etc.). Only the WL nodes 134 are given authorization to append the block chain.

While various embodiments described herein utilize designated WL nodes, it will be appreciated that the system could be modified to operate without such nodes, provided sufficient steps are taken to ensure the nodes are able to provide peer verification as discussed below. The WL nodes 134 in FIG. 4 may otherwise operate as "normal" user nodes like the user nodes 132, and thus may request and carry out normal security operation transactions.

The TSI authority 122 operates as a processing node to perform certain functions within the infrastructure such as generating challenge value responses and providing top level control of the block chain 136, WL 137 and admin table 138. As noted above, the TSI can be a single node, or can be multiple nodes administered by multiple entities. In some cases, multiple levels of TSI authorities can be established, with different levels having different actions that can be taken. For example, in a public/private network, the local private administrators may be provided a higher level of TSI authority than authorized administrators in the public portion of the network (such as, for example, in a customer/supplier relationship). The lower level TSI authorities may be permitted to perform some functions (issue authentication responses, modify some portions of the ledger, etc.) while the higher level TSI authorities can perform additional functions (issuing negative credits, reversing transactions, overall management, etc.).

Figure 5:
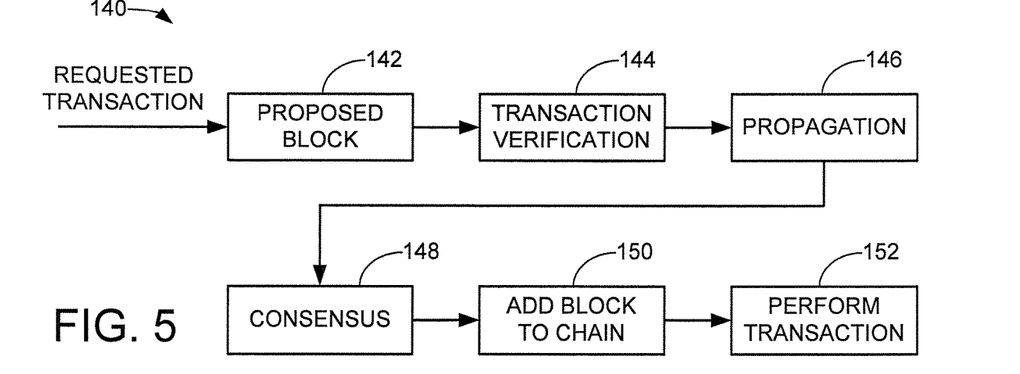
FIG. 5 is a flow sequence illustrating steps carried out by the system of FIG. 4.

FIG. 5 shows a process sequence flow 140 to generally illustrate operations carried out by the block chain security infrastructure 130. A block creation sequence is initiated at step 142 in response to a requested transaction from a selected node 132, 134. Transaction verification and propagation steps are carried out at 144 and 146.

Once a set of transactions has been sufficiently verified, a consensus mechanism is employed at step 148 to select a particular node to perform a block mining operation to form a valid block to be added to the block chain. The mined block is propagated back in the network for additional verification, after which the verified and mined block is added to the block chain 136 step 150. The updated block chain 136 is propagated to the entire network, at which point the associated user/data storage device identifies the result of the requested transaction and performs the security operation at step 152.

Figure 6:
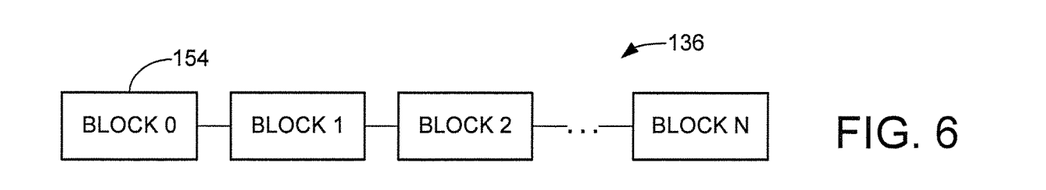
FIG. 6 is an exemplary format for a block chain data structure maintained by the system of FIG. 4.

As will be recognized, each block in a block chain will one or more transactions recorded therein. FIG. 6 shows a simplified representation of the block chain 136 with N+1 successive blocks 154 that have been successfully added thereto. The chain will continue to grow in length, providing a public history of all transactions that have been carried out by the system. As noted above, the block chain is accessible by all nodes in the network.

New blocks may be generated using any suitable mechanism. In one embodiment, new blocks are generated in a manner similar to the bitcoin system. Proof-of-work difficulty may be significantly easier than in the bitcoin system, however, and may be adjusted to ensure that the blocks can be generated at a reasonably fast rate, such as every 10-30 seconds or so. This ensures that the overall time required for a user to receive the validated results and proceed with an authorized security operation is not overly long (e.g., 1-2 minutes in some cases).

Generally, the initialization step 142 in FIG. 5 is carried out by accumulating all of the requested transactions from the various nodes during the most recent interval. Each block will include at least one transaction; if no transactions have been requested (such as during a lull period of network activity), the system pauses until a new transaction is received. If multiple pending transactions are present, the transactions may be paired and hashed using a suitable hashing algorithm such as but not limited to the SHA-256 (secure hash algorithm, 256 bits) hashing algorithm, as depicted by a first hash function block such as 160 in FIG. 7. This value may be referred to as the Merkle Root for the new block.

Figure 7:
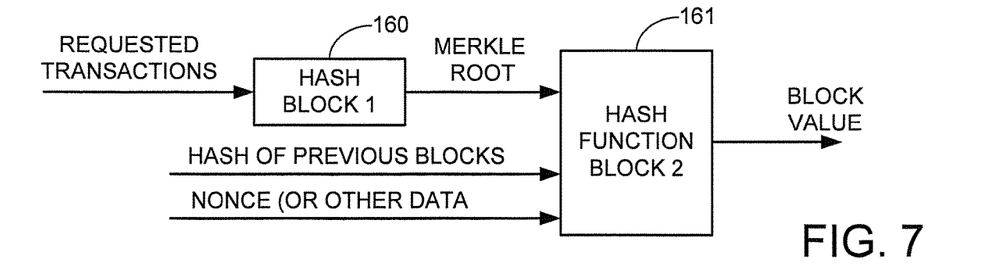
FIG. 7 illustrates example hash function processing that may be utilized to form aspects of the block chain.

The Merkle Root may be combined using a second hash block 161 with a combined hash value obtained by combining all of the blocks in the previous chain plus a nonce (random) value to satisfy some desired proof-of-work constraint, such as a selected number of leading zeros in the output block value. Other processing can be applied so this is merely exemplary and is not limiting.

The validation and propagation of the proposed block using the output block value, as represented by steps 144 and 146 in FIG. 5, will be discussed below. At this point, the present discussion will address aspects of the requested transaction(s) used to fox in the new candidate block beginning with reference to FIG. 8.

The various transactions in each block 154 are related to different storage device level security operations. In one embodiment, enabling a diagnostic port on a storage device may be considered as a single transaction. Other examples include allowing a firmware download, performing specific security actions such as secure erase, drive unlock, enable serial ports, allowing data downloads, changing security settings, etc. Any number of different types of security operations can be authorized by the system.

Figure 8:
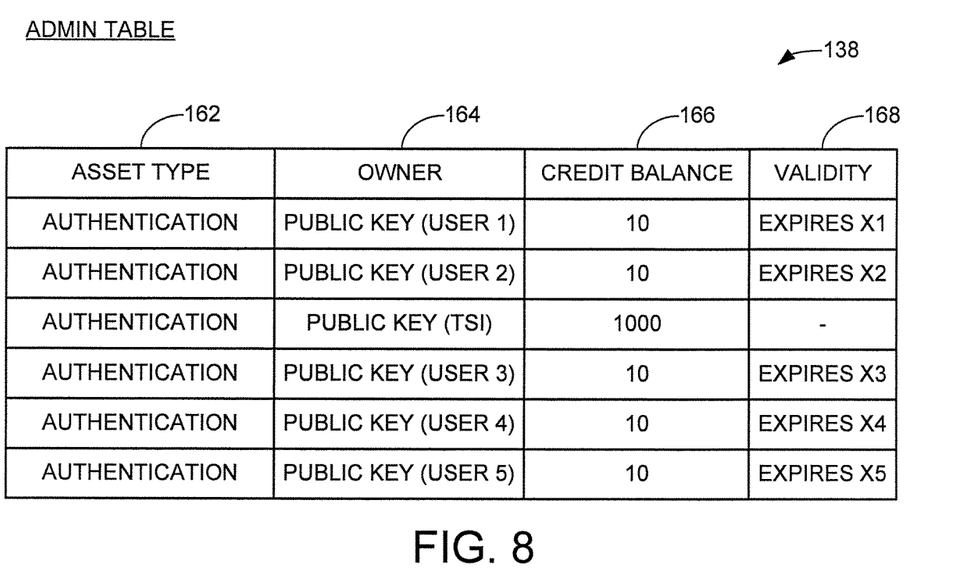
FIG. 8 is an exemplary format for an administrative table data structure that can be maintained by the system of FIG. 4.

FIG. 8 shows aspects of the admin table 138 from FIG. 4 managed by the TSI authority 122 in some embodiments. The format is merely illustrative, and other forms of data structures may be used. Aspects of the table 138, also referred to as a transaction structure, may be arranged as a simple database where each row corresponds to each user identified by the associated user's public key. A valid transaction can have a set of rules which, once satisfied, enables modification of the row.

The structure in FIG. 8 includes a number of columns including an asset type column 162, an owner column 164, a credit balance column 166 and a validity column 168. The asset type 162 for each row in FIG. 8 is identified as "authentication," but other asset types can be used such as the issuance of new credits, the revocation of credits, etc. The owner column 162 lists the public encryption keys of the various users as well as a public encryption key for the TSI authority. As noted above, the public encryption keys will form portion of public/private key pairs, and each entity will protect the associated private key. The public/private keys are used for signatures and other aspects discussed below.

The credit balance column 166 shows credit balances for each of the entities. The validity column 168 can be used to provide time limits for how long the credits will remain in effect.

Generally, the credits in column 166 are "spent" during each requested security transaction. Each user is given a starting credit balance by the TSI authority once the user joins the network. The granting of credits is a separate transaction that requires the new user to be validated in the same manner as when the credits are subsequently consumed. New credits are transferred from the TSI authority to the various users, and the credits are transferred from the various users back to the TSI authority credit pool during transactions.

Figure 9:
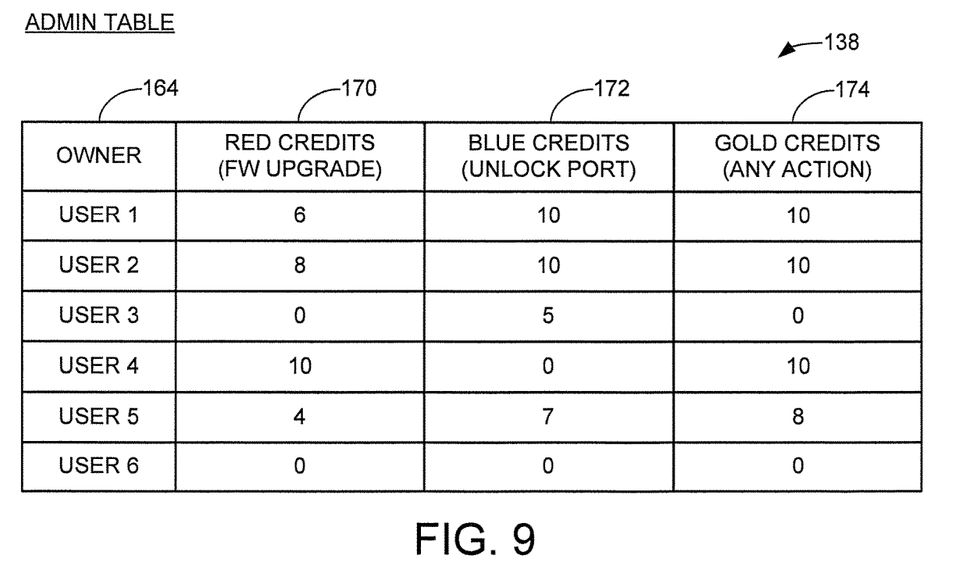
FIG. 9 shows further aspects of the table in some embodiments.

In some cases, each type of credit is the same, and each security operation requested by a user costs the same amount such as one (1) credit. Other configurations are contemplated, however. FIG. 9 shows further aspects of the admin table in which different types of credits may be issued to the various users for different types of operations. The example in FIG. 9 shows the use of colors to denote the different types of credits.

In this scheme, the "red credits" (column 170) enable a first type of security operation such as firmware upgrades. The "blue credits" (column 172) enable a second type of security operation such as the unlocking of diagnostic ports. Any number of different types of security schemes and types of credits can be used. The "gold credits" (column 174) can be used as master credits that enable any type of security operation.

In this approach, different users can be restricted from performing particular security tasks. In FIG. 9, User 3 has a zero (0) balance of red credits, which may be purposefully maintained to restrict the user from authorizing firmware upgrades to the storage device(s) associated with that user. Obviously, User 3 will not be granted any gold credits either under this restriction.

User 6 has a credit balance of zero (0) for all columns, which indicates that a new authentication process will be required before the user can receive a positive balance in some or all columns. Additional data may be incorporated into the data structure to indicate if different types of transactions require multiple credits.

Figure 10:
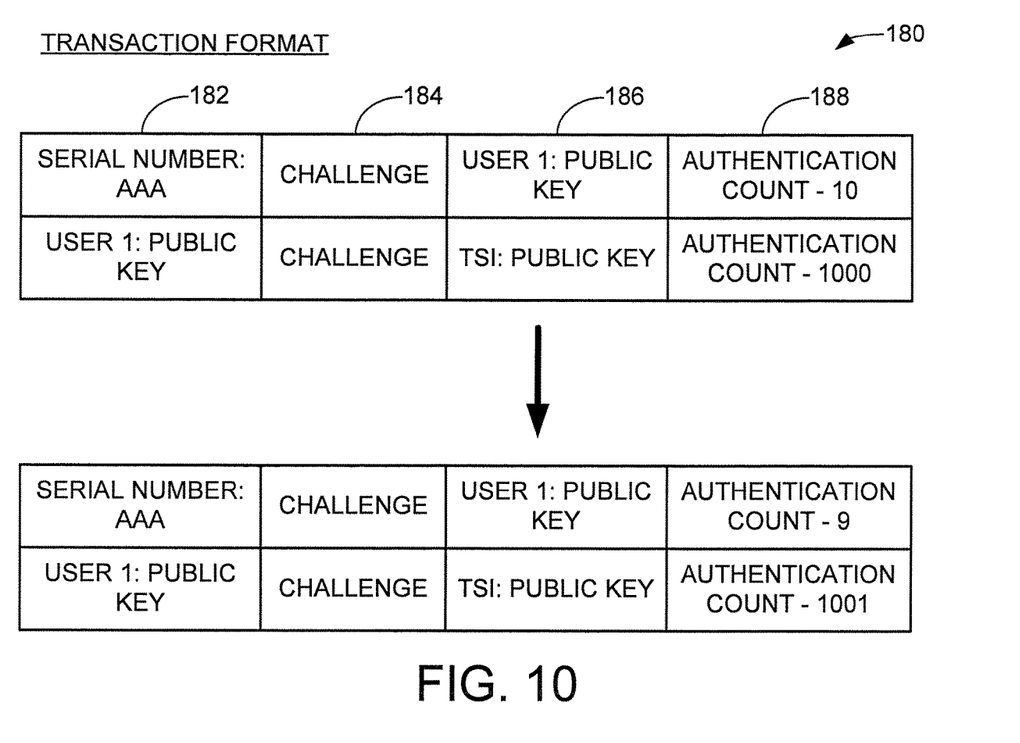
FIG. 10 generally illustrates aspects a transaction sequence in some embodiments.

FIG. 10 shows an exemplary transaction format for a requested transaction 180. Other formats can be used so FIG. 10 is merely illustrative and is not limiting. The transaction 180 includes a number of data elements or fields including a serial number value 182 that provides a unique identifier (ID) value associated with a selected storage device. A challenge value 184 constitutes a challenge string issued by the storage device. Field 186 provides the public key for the associated entity, as well as the existing authentication counts.

The user performs the transaction by passing the authentication count to the TSI, signing the transaction using the user's public key, and propagating the requested transaction to the network. The structure of the transaction allows the transaction to be tied to the associated user and storage device. Return information is provided to the requesting user as the transaction is completed, authorized and added to the block chain, as indicated by FIG. 10.

Figure 11:
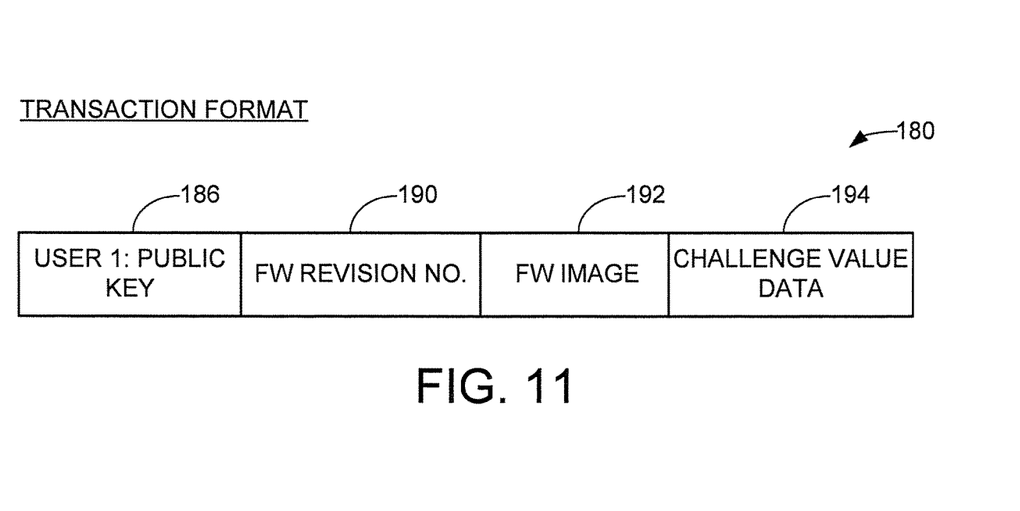
FIG. 11 shows further aspects that can be incorporated into a selected transaction.

As shown by FIG. 11, any number of different types of information can be included in the transaction, such as a firmware revision number 190, firmware image 192, challenge/response value data 194, etc. Other data can include employee global ID value, user information, a job number, addresses, namespaces, etc. Since the transactions will become part of the public ledger, encryption or other mechanisms can be used to mask sensitive information.

Once a transaction is made part of the block chain 136, the transaction becomes permanent and cannot be reversed or edited. Reversing the effect of an errant or rogue transaction is a core challenge to any block chain system. In some embodiments, a negative credit transaction can be used to offset or cancel the effect of any transaction. In a negative credit transaction, the TSI authority initiates the transaction to restore the system to its previous state.

As noted above, the TSI authority expires credits by spending and thus, can control access by individual users. This could be a separate transaction whereby the TSI authority removes credits from a given user and places these in a separate account or the TSI credit pool. Credits can have a limited amount of time during which the credits are valid so that, after that time limit has expired, the user is required to reauthenticate and request new credits.

Having now discussed various factors relating to the formatting of transactions, the present discussion will now turn to the processing of a newly proposed transaction through the system. The block chain 136 in the disclosed embodiments is a permissioned chain where every user can read from the chain, but only authorized users (WL nodes 134) can append the chain. The selection of the WL nodes can be an offline step where the system administrators select the WL nodes and issue certificates, etc.

Figure 12:
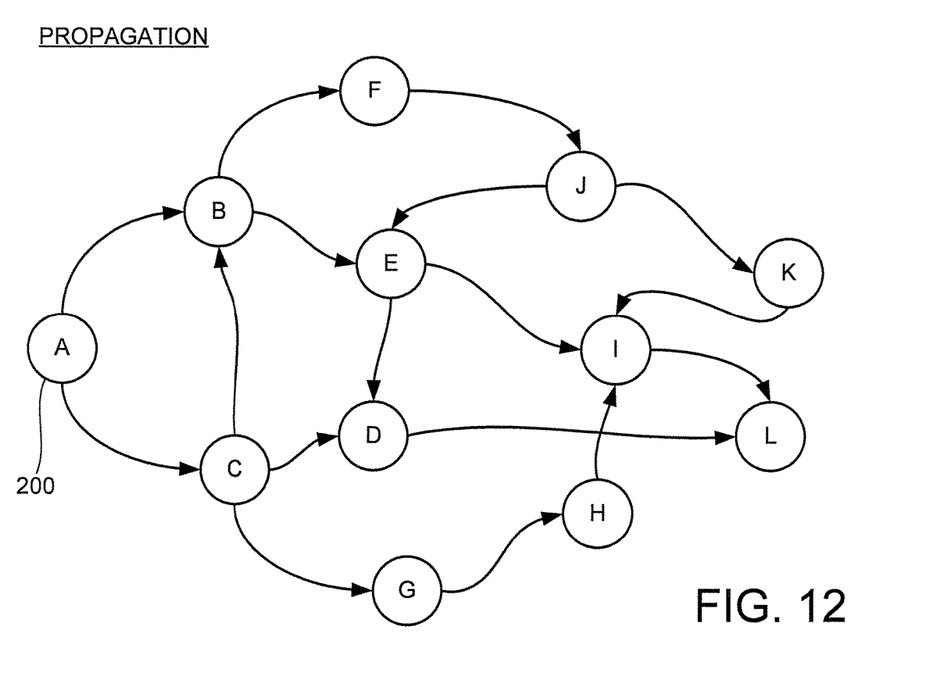
FIG. 12 is a propagation diagram illustrating a flow of information through nodes of the system of FIG. 4.

Proposed transactions are initially validated by neighboring blocks and propagated through the network. Valid transactions are retained, and invalid transactions are discarded. This process is illustrated by FIG. 12, which shows a number of nodes 200 in the network. The transaction path is arranged such that transactions are passed in turn from each node to that node's so-called "first hop" neighbor(s). A first hop neighbor is identified as a nearest neighboring node that is closest, in terms of intervening connections, to a base node.

In FIG. 12, assume that Node A generates a requested transaction in the format discussed above. The requested transaction is passed to Nodes B and C, since B and C are first hop neighbors to A within the network. Nodes B and C validate the transaction as an authorized transaction. This can be carried out in a variety of ways including reference to the type of requested transaction, reference to data in the admin table, etc. Once Nodes B and C have validated the transaction, the validated transaction is passed to the remaining nodes; for example, Node B passes the transaction to Nodes E and F, Node C passes to Nodes D and G, and so on. Invalid transactions are not propagated to further nodes. In some cases, invalid transactions may be flagged to the TSI authority for logging, investigation, etc.

Valid transactions are ordered and packaged into an "official" (valid) block. A consensus process is used to select the WL node that will be elected to generate the official block and add the block to the block chain.

The consensus process can be described as being governed by the well-known. Byzantine Generals problem, where distributed communications among decision makers attempting to form a consensus are subject to potential faults both in the decisions as well as in the communication of the decisions. Any number of methods can be used to address this, including a system based on the bitcoin proof-of-work scheme, the so-called Practical Byzantine Fault Tolerance system in which a leader block works as a miner and a voting mechanism is used to change the leader (resilient if total nodes are 3a+1 where a is the number of faulty nodes), Ripple's algorithm (different node lists and is resilient if total nodes are 5a+1), etc.

The mechanism selected should depend on the circumstances. A more detailed proof-of-work system may be more appropriate with a low-trust public network, while a higher trust private network may make proof-of-work schemes inefficient and unnecessary. Some embodiments of the present disclosure use a simple consensus mechanism with the difficulty set to create a new block every 10-30 seconds, while limiting block mining to the WL nodes.

Figure 13A:
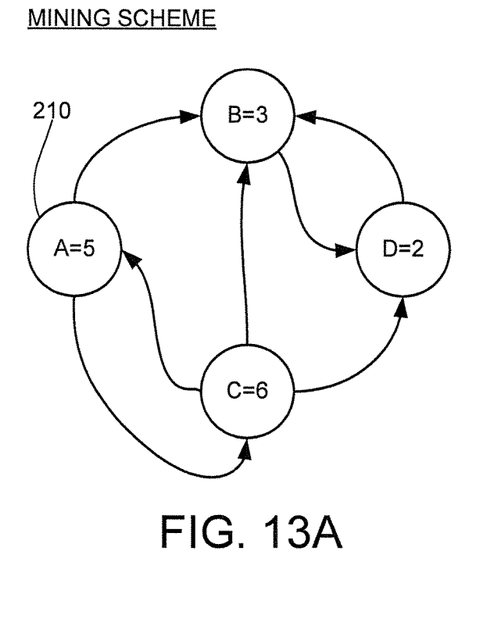
FIGS. 13A and 13B illustrate a lottery selection schema used to identify a mining node to process a block in the block chain.
Figure 13B:
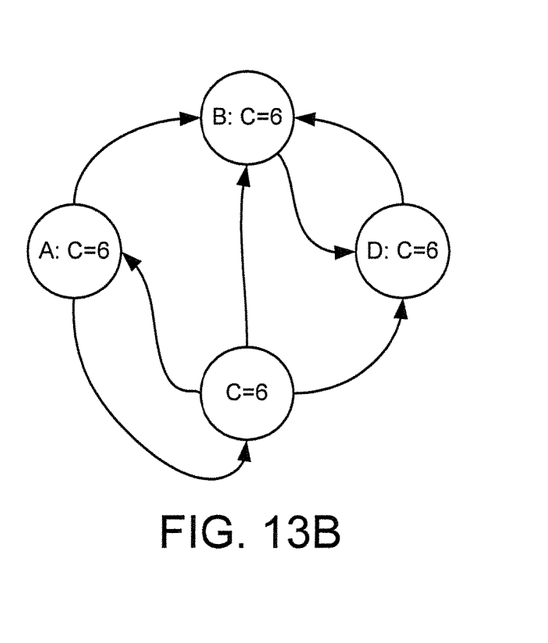

FIGS. 13A and 13B show a subset of WL nodes 210 in the network. This system enables consensus to be reached quickly and reliably. In this scheme, each of the WL nodes calculates a user token value and broadcasts the token values to the next-nearest WL neighbors. One example token generation scheme can be described as:

$$\text{User}(X)\text{Token}=\text{Hash}[\text{Serial No.},\text{Merkle Root},\text{MAC User}(X)] \quad (1)$$

Where User(X)Token is the token value for User X, Serial No. is the serial number for the storage device in the requested transaction, Merkle Root is the hash of all of the pending requested transactions, and MAC User X is the MAC (Message Authentication Code, or Key-Digest Value) generated by User X. A suitable hash function is used, such as SHA-256. Other forms of token values can be generated as desired using any number of other forms of cryptographic processing, so this is merely illustrative and not limiting. Each token value will tend to be unique to a particular user and particular block combination. In some cases, these values can be generated and passed during the propagation of the valid transactions.

As shown in FIG. 13A, four users associated with WL nodes A through D generate individual token values with relative magnitudes as follows: A=5; B=3; C=6; and D=2. Each user sends its token value to the adjacent next WL neighbor along with the user's digital signature. The signature has MAC addresses associated with it. An attacker will not be able to easily create a valid token as this will require the attacker to forge a fake certificate.

Figure 14:
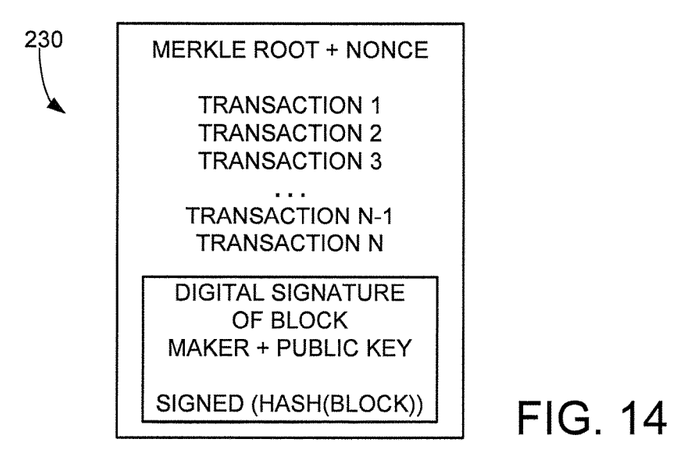
FIG. 14 illustrates a format for a block of the block chain as processed in FIG. 12.

As shown by FIG. 13B, the various token values quickly propagate through the network to all WL nodes 210, with each WL node identifying the node that has the largest token value (in this example, C=6). Thus, node C is selected as the node that will generate the mined block during this cycle. This mined block will be digitally signed by node C, after which node C will propagate the digitally signed block through the WL nodes, with each WL node authenticating and appending a digital signature thereto. This is referred to as a validated block, a format for which is shown at 230 in FIG. 14.

It is noted in this consensus scheme that the various WL nodes communicate with each other to reach the consensus on the selected node (e.g., Node C). In some cases, each WL node separately informs each of the remaining nodes of its selection. In other cases, the TSI authority tabulates the results and declares the winner. The system is fault-tolerant so that absolute unanimity is not required so long as sufficient margin is present to declare the winner based on distributed processing decisions. These and other consensus decision tabulation mechanisms can be used as desired.

While the present example selects the token value with the highest magnitude, this is merely illustrative and not limiting. More generally, the mining node is selected based on predetermined criteria associated with the relative magnitudes of the various token values obtained from the plurality of WL nodes. Hence, the group can select the token value with the lowest magnitude, the third-highest token value, and so on.

This lottery schema will tend to provide a quasi-random sequence of mining nodes for each successive cycle. An attacker will not be able to predict which node will generate the next block, making it difficult to insert and obtain validation for any fake transactions in the system. Moreover, this system advantageously spreads the processing requirements for the mining of the blocks evenly through the network, while providing relatively low processing complexity to generate the token values.

Figure 15:
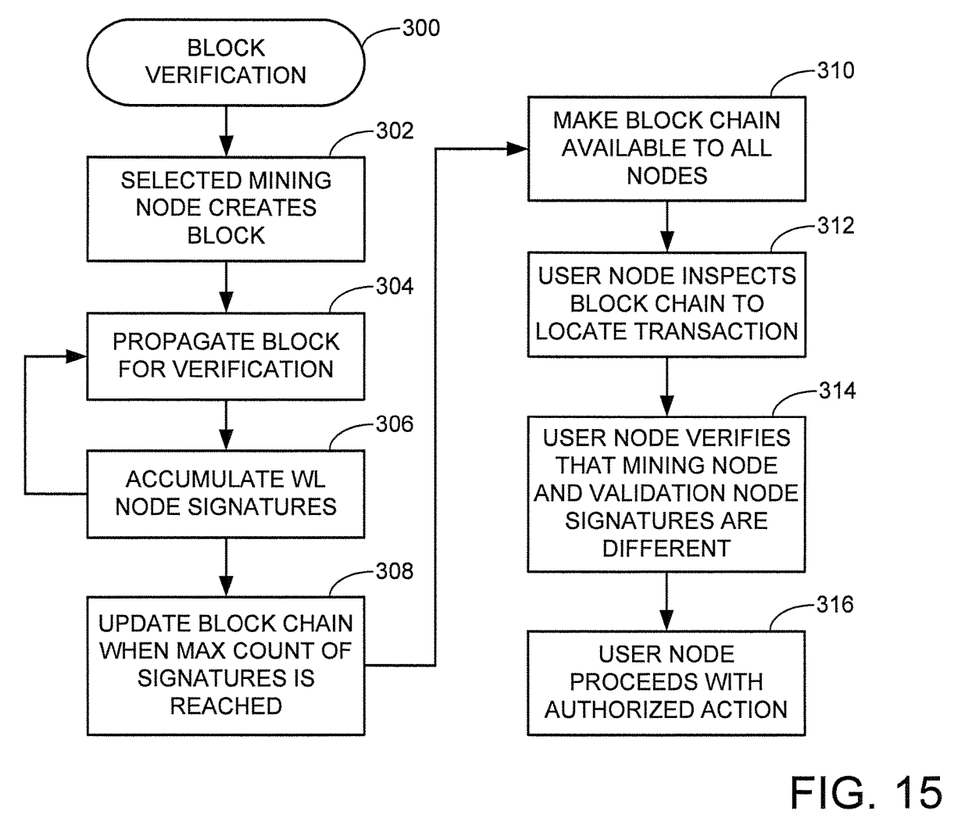
FIG. 15 is a flow chart for a block verification routine.

FIG. 15 provides a flow chart for a block verification routine 300 that describes this process in some embodiments. The various steps are exemplary and can be modified, appended, etc. depending on the requirements of a given application.

As shown at step 302, the selected mining node (e.g., Node C) creates the new block at step 302, and passes the block to the next near neighboring WL nodes, step 304. Each WL node verifies the block and appends a different digital signature to the block, step 306. This continues until some threshold (max) count of signatures is reached, step 308. In one embodiment, the processing of steps 304, 306 continue until a threshold (max) count of ten (10) verification signatures is obtained, although other numbers can be used. It will be noted that at least two (2) signatures are required from different nodes, one from the mining node and one from at least one verifying node.

Once the threshold (max) count of verification signatures is obtained, the block is officially appended to the existing block chain (see FIG. 6) and propagated throughout the entire network, including to all user nodes, step 310. In some cases, the TSI authority monitors the blocks and makes this determination; in other cases, the first WL node to receive a block for verification and notes that the required number of signatures is present notifies or otherwise forwards the block to the TSI authority. Further verifications by the WL nodes are not carried out once the block has been added to the chain.

As the updated block chain propagates through the network, each node (whether WL node or regular user node) examines the latest block in the node and searches for any transactions involving the storage device(s) associated with that node. This is shown by step 312. At step 314, the user node having transactions further proceeds to verify that the block has at least two valid signatures from different nodes; one from the mining WL node and one from at least one other WL node. If so, the user node proceeds with the authorized action, step 316. As noted above, the required data to carry out the security operation may be listed (or encrypted within) the transaction listed in the verified block.

Validations by the user node can include verifying the signatures of the mining and verification nodes, processing any challenge strings or other information in the body of the transaction, and proceeding with activation of any features or routines as requested.

One aspect of this process is that, under conventional systems, once a storage device has been authenticated and authorized to receive a change in security state, such as downloading of new firmware, then generally any firmware can be generally installed. However, in this scheme limits can be provided such as by limiting the new firmware to a specific firmware revision. Indeed, the authorized firmware image can be encrypted and presented as part of the validated process (e.g., embedded within the transaction), ensuring that a local user, having gained access to the drive, is still constrained in what can be loaded to the storage device.

Another aspect of this process is that peer-based validation of transaction requests and peer-based judgments on user authentication are carried out for both mining and authentication. Distributed evaluation of peers provides a consensus of user trust.

Finally, it will be reminded that existing security protocols are still in place in this system. For example, transactions involving the correct processing by the TSI (and/or the user) of an issued challenge value can still be in place; ultimately the challenge/response sequence will be decoded at the data storage device (or other target processing device) level and internal constraints must be satisfied before the data storage device allows the process to proceed.

It will be recalled from the timing sequence of FIG. 3 that the block chain processing described herein are used to validate and record transactions. While aspects of the block chain processing path is used to validate a given user, verify requested transactions, communicate results, etc., it will be appreciated that there are still internal calculations, challenge value generation operations, encryption operations, etc. that are carried out by the respective entities in the system. These other operations are not necessarily part of, nor are recorded in, the block chain except to the extent that results may be communicated as part of a new block.

Figure 16:
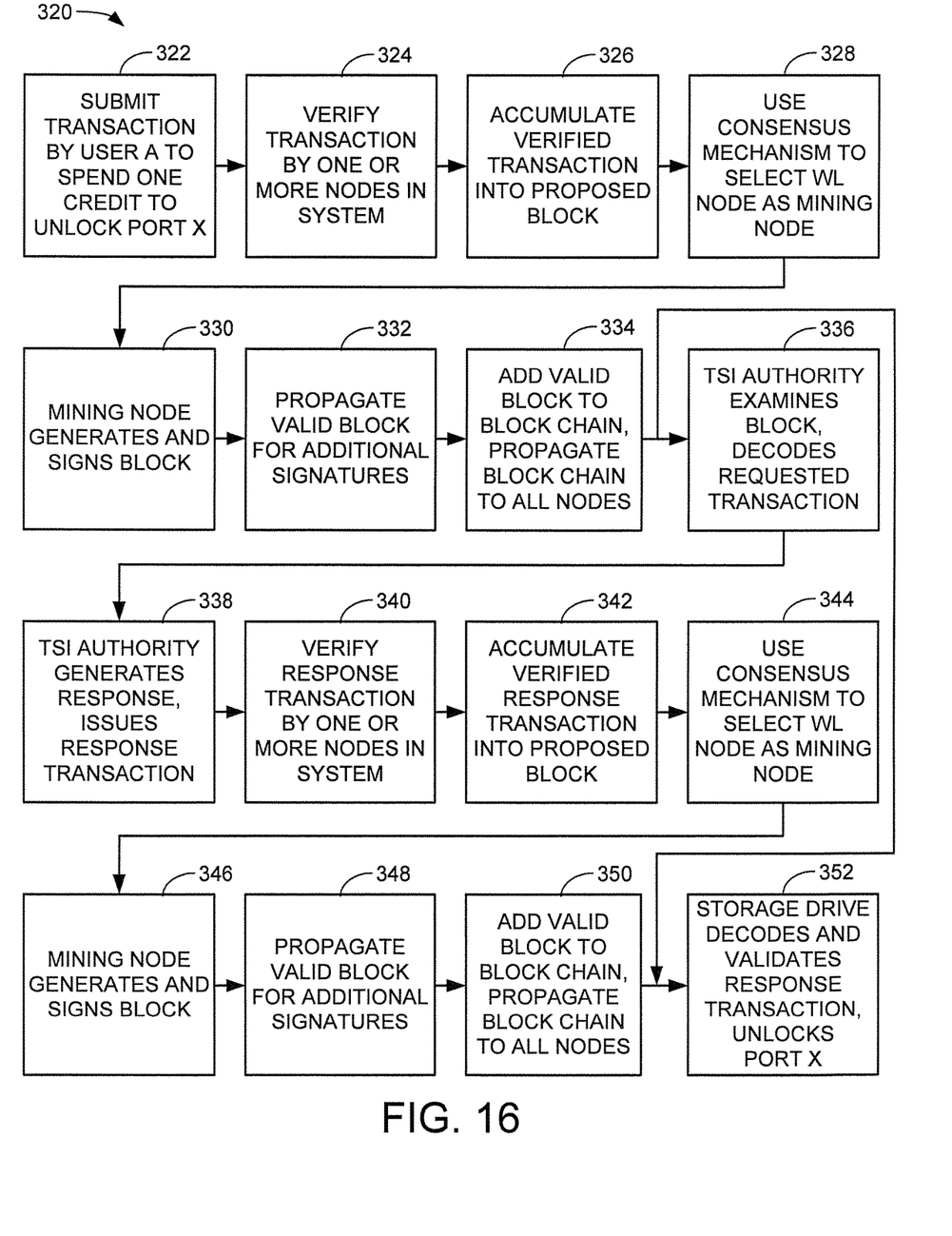
FIG. 16 is a flow diagram for a transaction response sequence carried out by the system in accordance with some embodiments.

FIG. 16 shows a detailed flow diagram 320 to illustrate an exemplary transaction sequence that may be carried out in accordance with the foregoing discussions. It is contemplated that the flow in FIG. 16 is provided to communicate and service a request by selected User A to spend one (1) credit to allow Port X of Storage Device Y to be unlocked. Other transactions will follow a similar path depending on the processing involved.

Step 322 shows the generation and propagation of the proposed transaction by User A. The format of the transaction will include various challenge values, signatures, MAC values, etc. as discussed herein sufficient to enable the TSI authority to perform the necessary processing provided User A is determined to have the appropriate credentials and authorization to make this request.

The transaction is verified by one or more nodes at step 324 and accumulated into a proposed block of transactions at step 326. The aforementioned consensus mechanism is carried out among the various WL nodes in the system to select the WL node that will perform the mining operation at step 328. The block is mined and signed by the mining block at 330, and then passed to the various WL nodes in the system for signatures, block 332.

Once sufficient signatures have been added, the block is added to the block chain and propagated to all nodes in the system, step 334. While not shown, it will be understood that the admin table may be updated at this time (once the block is officially added) to decrement the credit balance for User A and increment the credit balance for the TSI authority. The admin table can be updated at other suitable times as well, such as once the transaction is validated and the block is formed.

The TSI authority will examine the block and decode the requested transaction based on the transaction being a portion of a valid block, step 338. The TSI authority will next perform the necessary internal calculations or other processing operations, including cryptographic processing operations, to prepare a response to the requested transaction, step 340. This step also includes the issuance of a response transaction that includes the necessary information to be provided back to User A for the initial request (port access).

Similar processing is carried out as before to validate the transaction response; while not strictly necessary since from an operational standpoint the TSI authority could simply communicate the results to User A, this approach does not protect against a response from an attacker spoofing the TSI authority, nor would such an approach enable the response to be logged to the block chain.

Accordingly, step 340 shows that the response transaction from the TSI authority is verified, after which the verified response transaction is accumulated into a new proposed block at step 342. It is contemplated that since the TSI authority will not act upon the request from the User A until the requested transaction has been added to a valid block, then generally multi-entity transactions that involve a request/response from different entities will tend to appear in successive blocks in the block chain.

As before, a consensus mechanism is used at step 344 to select an appropriate WL node as the mining node to generate the new block. In most cases, it is contemplated that the mining node selected in step 328 will be different from the mining node selected at step 344. The selected mining node generates and signs the valid block at step 346. The valid block is propagated and signed multiple times at step 348, and once the threshold (max) count of signatures is accumulated, the block is added to the block chain and the new block is propagated to all nodes in the system at step 350. Finally, the storage device (drive) associated with User A examines the newly received block, determines that the response is valid, and proceeds to unlock the port.

The involvement of the TSI authority from steps 336-350 is contemplated but not necessarily required. In other scenarios, the flow can be configured to move directly from step 336 to step 352 as shown in FIG. 16. In this way, once the block has been added to the block chain, the storage device can decode the validated transaction and proceed with the required operation.

It is contemplated that the entire validation time for a sequence such as in FIG. 16 will be sufficiently short as to meet user expectations, such as on the order of 1-2 minutes or less, depending on the frequency at which new blocks are generated. It will be noted that new blocks are received by each node in the system on a regular rate. Some blocks will be valid blocks that are now part of the official block chain, in which case each node will scan the transaction list to determine if any transactions are associated with that node before forwarding to the next neighboring nodes. In other cases, the blocks may not yet be validated in which case the node will perform whatever processing is required (e.g., validation of transaction, validation of block with signature) assuming the block is a WL node, otherwise the node will simply pass the unverified block to the near-neighbor nodes.

As noted above, the entire transaction history is made available via the block chain, which is maintained in an essentially tamper proof condition. The block chain provides analytical information that can be evaluated for individual drives or groups of drives. Data such as firmware version downloads, execution of diagnostic commands, etc. can be captured and retained by the block chain, and this information can be useful in a number of areas including new product development, development of further firmware revisions, failure analysis, warranty registration and warranty repair situations. In particular, a transaction can be initiated for warranty registration when a user first purchases a drive, and the block chain ledger can be used to verify warranty period, configuration, etc. at a later date.

Figure 17:
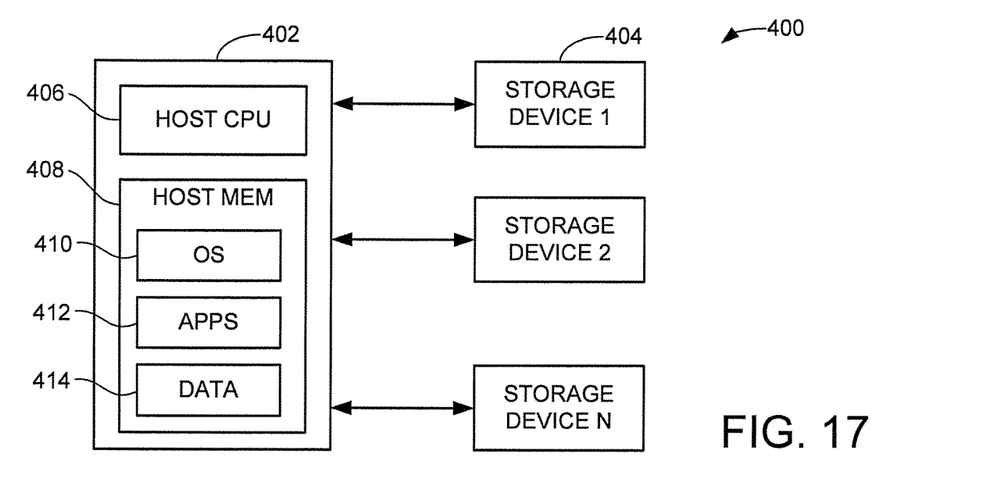
FIG. 17 shows the host device of FIG. 1 in greater detail in some embodiments.

FIG. 17 is a functional block diagram for a selected node 400 in the system to show further details in accordance with some embodiments. The node includes a host device 402 and a plural number N storage devices 404. The host device 402 includes various operational components including a host CPU (controller or processor) 406, realizable as a programmable and/or hardware based processor circuit, and a host memory 408. The host memory can store various forms of programming instructions and data including an operating system (OS) 410, one or more applications (apps) 412, and data 414.

In some cases, the various operations discussed above can be carried out at the node level using suitable programming stored in the host memory 404 and executed by the host CPU 406. However, in some cases intelligent storage devices may be used so that the processing is instead carried out directly at the storage device level (with or without the presence of the host). The node 400 illustrated in FIG. 16 can take any number of forms including a data storage server, a NAS (network attached storage) node, a RAID server, a cloud computing environment node, etc.

Figure 18:
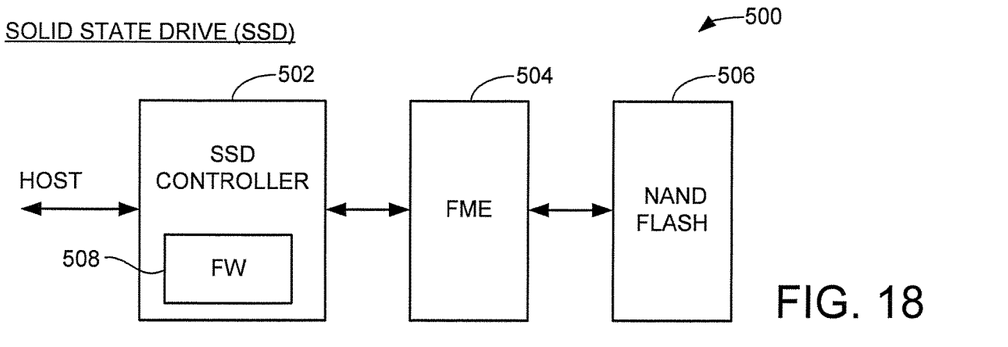
FIG. 18 shows the data storage device of FIG. 1 characterized as a solid state drive (SSD).

FIG. 18 shows a functional block representation of a data storage device 500 characterized as a solid-state drive (SSD). The SSD 500 includes an SSD controller 502, a flash memory electronics (FME) circuit 504 and a NAND flash memory 506. As before, the SSD controller 502 can be a hardware and/or programmable processor based circuit arranged to carry out various operations described herein, including the generation and issuance of challenge/response values, encryption/decryption, etc. In some cases, the SSD controller 502 may utilize firmware (FW) 508 that is stored in a local memory, executed by the SSD controller 502 and accessed/updated by a user in accordance with the above discussion.

Figure 19:
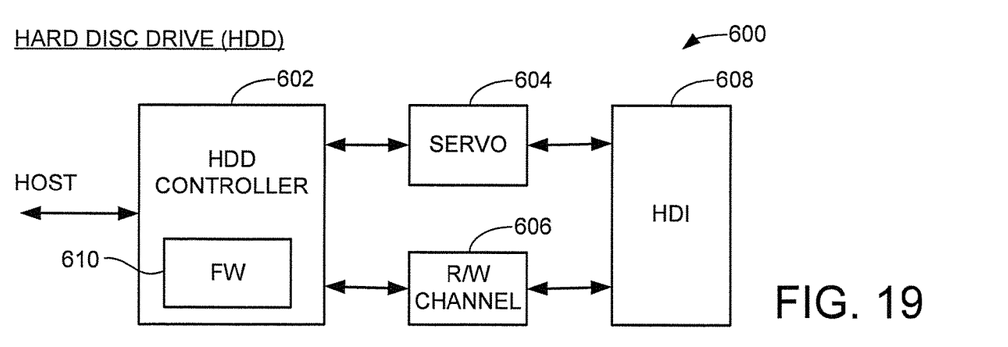
FIG. 19 shows the data storage device of FIG. 1 characterized as a hard disc drive (HDD).

FIG. 19 is a functional block representation of another data storage device 600 characterized as a hard disc drive (HDD). The HDD 600 includes an HDD controller 602, a closed loop servo circuit 604, a read/write (R/W) channel 606 and a head/disc interface (HDI) 608 that may include at least one moveable data read/write transducer supported adjacent a rotatable data recording medium (e.g., magnetic recording disc).

As before, the HDD controller 602 may be hardware or programmable processor based, and may be configured to carry out various functions as part of the block chain security scheme disclosed herein. HDD FW 610 stored in a local memory may be accessed and updated using the methods discussed above. Other forms of data storage devices, such as hybrid data storage devices that use both rotatable and solid-state memory (e.g., NAND flash, etc.) may also be used in accordance with the various embodiments.

While the various embodiments presented above have been directed to the environment of a data storage device network, such is merely exemplary and is not limiting. Substantially any processing environment that utilizes security measures to provide and govern security access to processing devices can benefit from the implementation of the various principles disclosed herein.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A method comprising:
    generating a requested transaction to perform a selected security operation upon a data processing device coupled to a computer network;
    propagating the requested transaction to each of a plurality of nodes within the computer network, each of the plurality of nodes applying a hash function to a combination that includes at least the requested transaction and a unique identification (ID) value associated with the associated node to generate a unique token value;

propagating, by each of the plurality of nodes to each of the remaining nodes, the associated unique token value and a corresponding digital signature, each node receiving and comparing all of the unique token values from all of the nodes and validating the received token values using the associated digital signatures;

choosing, by the plurality of nodes, a single selected node from among the plurality of nodes in relation to the relative magnitudes of the unique token values;

using the selected node to generate a block comprising the requested transaction;

appending the generated block to a block chain structure stored in a memory; and processing the requested transaction to authorize the selected security operation responsive to receipt of the block chain structure by a target node in the computer network.

2. The method of claim 1, wherein the selected node is chosen by the plurality of nodes by comparing the unique token values from each of the plurality of nodes and identifying the selected node based on a relative magnitude of the associated token value for the selected node in relation to a relative magnitude of the associated token values for each of the remaining nodes, each of the plurality of nodes separately identifying the selected node based on the comparison.

3. The method of claim 2, wherein the token value for the selected value has a magnitude that is greater than a magnitude of each of the remaining token values.

4. The method of claim 1, wherein the block of the using step is generated by applying a second cryptographic function to the requested transaction to generate a cryptographic result and by appending a digital signature, by the selected node, to the cryptographic result based on a private encryption key associated with the selected node.

5. The method of claim 4, wherein the appending step further comprises verifying the block and appending a second digital signature to the cryptographic result based on a second private encryption key associated with a second selected node, and wherein the block is appended to the block chain data structure responsive to the presence of the digital signature and the second digital signature.

6. The method of claim 1, wherein the processing step comprises verifying that the block added to the block chain data structure has a first digital signature from the selected node that generated the block and a second digital signature from a different node that verified the block.

7. The method of claim 6, wherein the processing step further comprises repeating the generating, propagating, identifying, using and appending steps for a response transaction generated in response to the requested transaction to generate a response block that is added to the block chain data structure, the response block generated by a different selected node.

8. The method of claim 1, wherein the data processing device is a data storage device, and the selected security operation is configured to authorize a host device to perform a data transfer operation with a memory of the data storage device.

9. The method of claim 8, wherein the requested transaction comprises an identifier value associated with the data storage device, a public encryption key associated with a user of the data storage device, and a challenge value generated by the data storage device.

10. The method of claim 1, wherein the plurality of nodes comprise white listed (WL) nodes in the network, each having a certificate enabling the associated WL node to generate, validate and digitally sign the block.

11. The method of claim 10, wherein the plurality of nodes further comprise a trusted security infrastructure (TSI) authority node which operates during the processing step to generate a response to the requested transaction to authorize performance of the selected security operation, the TSI authority node further configured to maintain an administrative table data structure in a memory that allocates credits to each of a plurality of users associated with the data processing device and the plurality of nodes, wherein the TSI authority debits the user associated with the data processing device by a selected number of credits and credits the TSI authority circuit by the selected number of credits responsive to the requested transaction, and wherein the TSI authority prohibits the selected security operation responsive to a zero or negative credit balance.

12. The method of claim 1, wherein the propagating step comprises, for each of the plurality of nodes, forwarding the requested transaction to at least one next-hop neighboring node in the network so that the requested transaction sequentially propagates to all of the plurality of nodes in succession, and wherein the combination further includes a unique serial number associated with the data processing device.

13. A computer system comprising:

a first node comprising a host device and a data processing device, the host device comprising a host device controller circuit configured to generate a requested transaction to authorize a selected security operation associated with the data processing device;

a plurality of white listed (WL) nodes coupled to the first node to receive the requested transaction via a computer network, each of the WL nodes comprising a WL node controller circuit configured to validate the requested transaction, generate a unique token value responsive to application of a hash function to a combined string comprising the requested transaction and a unique identification (ID) value assigned to the associated node, and to apply a consensus mechanism to elect a selected one of the plurality of WL nodes to generate, digitally sign, and add a block comprising the requested transaction to a block chain data structure, the consensus mechanism including propagation of each unique token value by each WL node to all of the remaining WL nodes and identification of the selected one of the plurality of WL nodes by at least a majority of the WL nodes based on the relative magnitudes of the unique token values; and a trusted security infrastructure (TSI) authority circuit configured to, responsive to receipt of the block chain data structure including the block generated, digitally signed and added by the selected one of the plurality of WL nodes, generate an output value to authorize the selected security operation upon the data processing device the TSI authority circuit further configured to maintain an administrative table data structure in a memory that allocates credits to each of a plurality of users associated with the first node and the WL nodes, wherein the TSI authority debits the user associated with the first node by a selected number of credits and credits the TSI authority circuit by the selected number of credits responsive to the requested transaction, and wherein the TSI authority prohibits the selected security operation responsive to a zero or negative credit balance associated with the first user.

14. The computer system of claim 13, wherein a first type of credit is maintained in the administrative table data structure for a first type of security operation and a different, second type of credit is maintained in the administrative table data structure for a different, second type of security operation, and wherein the TSI authority prohibits the requested transaction responsive to a zero or negative balance.

15. The computer system of claim 13, wherein the data processing device of the first node comprises a data storage device comprising:
   a non-volatile memory (NVM); and
   a data storage device controller circuit configured to communicate with the plurality of additional nodes to store and retrieve user data from the NVM.

16. The computer system of claim 15, wherein the data storage device is characterized as a solid-state drive (SSD), the NVM comprising flash memory, the data storage device controller circuit comprising a programmable processor with associated programming executable by the programmable processor and stored in a local memory.

17. The computer system of claim 13, wherein the unique ID value comprises a Message Authentication Code (MAC) value generated by the associated node.

18. The computer system of claim 13, wherein responsive to the TSI generating an output value to authorize the selected security operation upon the data processing device, each of the WL nodes further operate to generate a second unique token value responsive to application of the hash function to a second combined string comprising the output value and a unique identification (ID) value assigned to the associated node, and to apply a second consensus mechanism to elect a different, second selected one of the plurality of WL nodes to generate, digitally sign, and add a second block comprising the output value to the block chain data structure, the second consensus mechanism including propagation of each second unique token value by each WL node to all of the remaining WL nodes and identification of the different, second selected one of the plurality of WL nodes by at least a majority of the WL nodes based on the relative magnitudes of the second unique token values, and wherein the data processing device performs the security operation in response to the addition of the second block to the block chain.

* * * * *